(No Model.)
2 Sheets—Sheet 1.
B. WOLHAUPTER.
BRAKE MECHANISM FOR CARS.
No. 516,257. Patented Mar. 13, 1894.
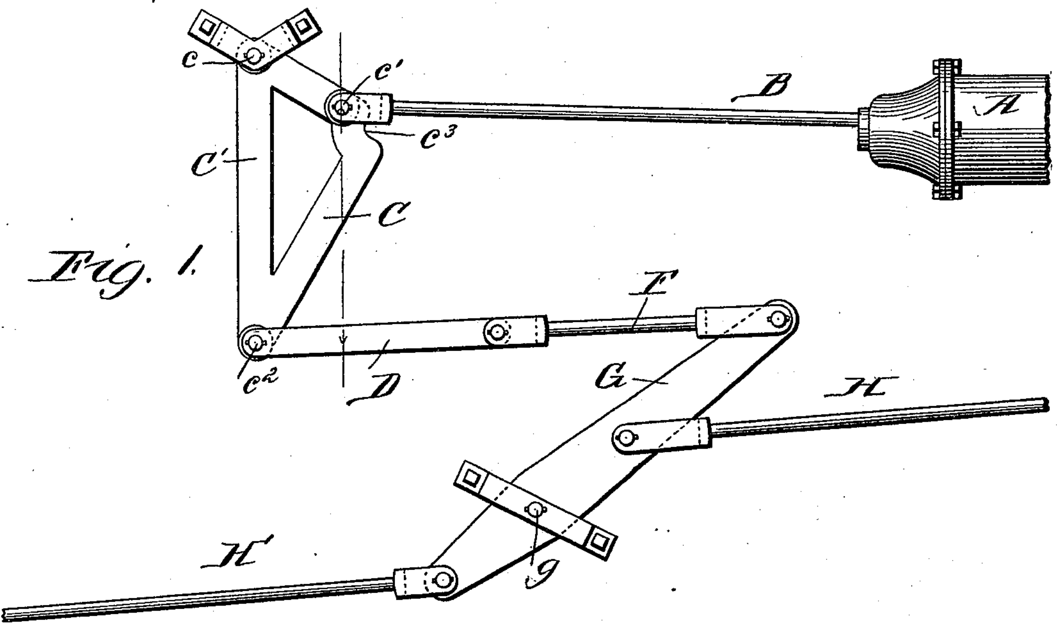
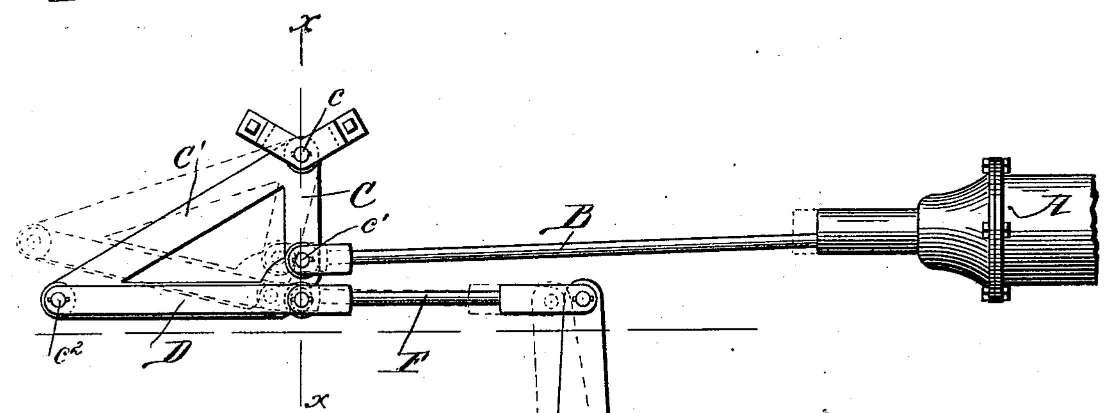
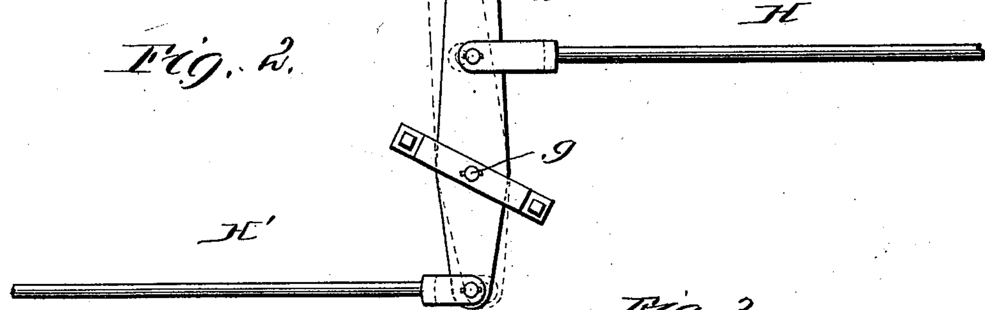
Witnesses.
Fredk. H. Miles.
M. Chamberlin.
Inventor
Benjamin Wolhaupter
By Walter H. Chamberlin
Atty.
THE NATIONAL LITHOGRAPHING COMPANY, WASHINGTON, D. C.

(No Model.)
2 Sheets—Sheet 2.
B. WOLHAUPTER.
BRAKE MECHANISM FOR CARS.
No. 516,257. Patented Mar. 13, 1894.
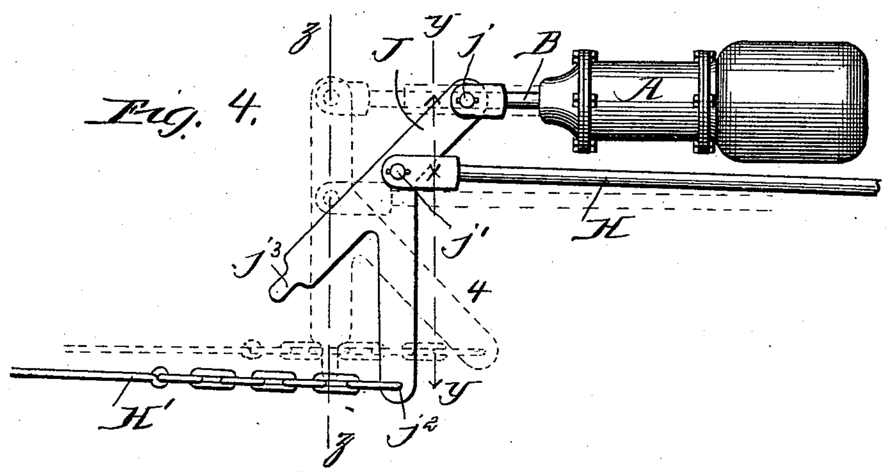
Witnesses.
Fredk. H. Wells.
M. Chamberlin.
Inventor:
Benjamin Wolhaupter
By Walter H. Chamberlin Atty.
THE NATIONAL LITHOGRAPHING COMPANY, WASHINGTON, D. C.

UNITED STATES PATENT OFFICE.

BENJAMIN WOLHAUPTER, OF OAK PARK, ILLINOIS.

BRAKE MECHANISM FOR CARS.

SPECIFICATION forming part of Letters Patent No. 516,257, dated March 13, 1894.

Application filed May 31, 1892. Serial No. 434,921. (No model.)

*To all whom it may concern:*

Be it known that I, BENJAMIN WOLHAUPTER, a subject of the Queen of Great Britain, residing at Oak Park, county of Cook, State of Illinois, have invented a certain new and useful Improvement in Air-Brake Mechanism; and I declare the following to be a full, clear, and exact description of the invention, such as will enable others skilled in the art to which it pertains to make and use the same, reference being had to the accompanying drawings, which form a part of this specification.

My invention has for its object the production of mechanism that shall be more particularly applicable to those constructions of air brakes in which is employed mechanism whereby when the car is loaded the braking pressure on the brake shoes is increased in proportion to the increased weight of the car by virtue of its load. Thus the minimum braking pressure is applied to the shoes when the car is light or empty but as the load is increased the quantity of pressure on the shoes is increased. But with a given pressure of air in the air reservoir, the only way to obtain this increased pressure on the shoes is to change the relative fulcrum point and length of the connecting levers. But this change in the length of the lever to obtain the increased pressure on the shoes, increases the travel of the piston in the air cylinder thus necessitating an entirely new cylinder in the practical application of such mechanism as just described. Thus, supposing the travel of the piston in the cylinder now in use to be twelve inches, and supposing the first four inches of the travel are employed to take up the slack in the parts and bring the shoes against the wheels. Now supposing the braking pressure is to be increased three-fold, with the same air pressure. This necessitates a corresponding change in the length of the lever and consequently an increase in the travel of the piston to twelve inches in order to bring the shoes against the wheel. This leaves no space for the piston to travel in applying the braking pressure and leaves no space for additional travel of the piston necessitated by the wear on the shoes. My invention is designed to remedy this defect and make such apparatus applicable to the brake mechanism now in use, by providing a lever bent or shaped in such a manner that the preliminary travel of the piston necessary to take up the slack of the shoes is reduced and at the same time the braking pressure applied by the latter part of the piston's motion, is increased.

My invention is also clearly applicable to the air brake and other brake mechanism now in use irrespective of that class in which the braking pressure is altered in proportion to the weight of the car and I would be understood as contemplating its application to any of the brake mechanisms now employed.

In the drawings: Figure 1— is a diagrammatic view of the parts used to carry out my invention, said parts being in their initial position, that is with the brake shoes away from the wheels. Fig. 2— represents the position of the parts when the shoes come to a bearing on the wheels and before the braking pressure is applied. Fig. 3— is an edge elevation showing the relative positions of the parts. Fig. 4 illustrates a variation in the form of the lever whereby my invention may be carried out.

In carrying out my invention A represents the air reservoir and B the piston rod.

C (Figs. 1 and 2) is a lever of substantially a bell crank form with the diagonal brace C′— thus making it a triangular form. This lever is pivoted to a stationary part at $c$. The piston rod is pivoted to this lever at $c'$.

Pivoted to the outer end of the long arm of the lever as at $c^2$— are the connecting links D— D′— and pivoted to the end of these links by the bolt E— is the connecting rod F. An intermediate spool or washer E′— is placed between the links D— D′— on the bolt E. The end of the rod F— is pivoted to the lever G— the latter being fulcrumed at $g$— to a stationary part.

H— H′— are the ordinary rods or connections extending to the brake beams or brake levers as the case may be.

In the edge of the lever C— is the recess $c^3$. Now as is well known the first movement of the piston is merely for the purpose of setting the shoes against the wheels and takes only a small amount of power to accomplish. Therefore by pivoting the links D— D′— (which through the lever G— and rods H— H′— are directly connected with the brake shoes) to the long arm of the lever C— the initial pressure of the piston rod will as shown in Fig. 2— cause the long arm of the lever to travel a considerably greater distance than the short arm to which the piston rod is attached, thereby rapidly altering the relative length of the power and weight arms of the lever, and bringing them to more nearly the same leverage length. Thus by a comparatively short movement of the piston rod the brake shoes are set against the wheels and the parts assume substantially the position shown in Fig. 2— with the links D— D'— parallel with the long arm of the lever and the spool or washer E'— resting on the recess $c^3$. Thereafter the distance traveled by the piston and the parts connected with the brake shoes is substantially the same, because as soon as the links assume the position shown in Fig. 2— the leverage is on the line $x$—$x$. It will thus be observed that by employing a lever of substantially the shape shown, at the time the piston starts in its movement the travel of the weight end of the lever is much more rapid than the power end but as the shoes come to a bearing the leverage length of the weight end is reduced because of the change in the position of the complex lever and the travel of the two thereafter remains in the same proportion. It will be observed that this lever C is what may be termed a complex lever, that is to say it has three leverage arms as follows: From the point $c$ to the point $c'$ is one leverage arm, from the point $c$ to the point $c^2$ another leverage arm, and from the point $c$ to the point $c^3$ another leverage arm. Upon the initial movement of the lever to set the brakes the arms $c$ to $c'$ and $c$ to $c^2$ are brought into play. As the shoes approach the wheels the use of the arm $c$ to $c^2$ is discontinued and the arms $c$ to $c'$ and $c$ to $c^3$ are employed. There are of course many different forms of levers which might be employed to obtain the same result aimed at by my invention. For instance in Fig. 4— I have illustrated another form of lever. The piston rod B— is pivoted to the end $j$— of the lever J— one of the brake rods H— is pivoted at $j'$— and the other brake rod H'— is $j^2$. The movement would of course throw the parts to the position shown by dotted lines, the initial leverage being on the line $y$—$y$ and, being about as one to four, while the final leverage is on the line $z$—$z$ and is about as one to one. The end $j^3$— is forked so as to engage the flexible connection which connects the lever H'— and the lever J— so that the proportion of the final leverage may be maintained after the shoes have come to a bearing. In this form of lever I also have a complex lever, that is to say one with three or more arms, the said leverage arms being from the point $j$ to $j'$ and $j$ to $j^2$; and after the shoes have been brought against the wheels from $j$ to $j^3$. The parts are so arranged that the equality of the leverage will be reached about the time the shoes come to a bearing on the wheels. Now it will be observed that in each of the forms of the levers above shown I have provided a lever in which the difference in the proportional leverage length of its two arms is reduced as its position is altered by the movement of the piston until the shoes come to a bearing after which the proportional leverage lengths remain the same. By this construction I obtain at the beginning of the piston movement or with a comparatively small movement thereto, the pressure of the shoes on the wheels without causing the air in the cylinder to expand to any great extent and thus reduce the desired pressure for braking. I also obtain the necessary movement of the brake shoes to set them against the wheels by a comparatively small movement of the piston rod.

I would have it understood that the term complex lever as used by me in the above specification, and in my claims, is employed in its broadest sense mechanically and the said term complex lever is designed to include any and all of the various forms of mechanical constructions whereby the mechanical principle of leverage is obtained by use of three or more leverage arms or points.

What I claim is—

1. In a brake mechanism the combination with the power supply and the rods or other connections for the brake shoes of a complex lever connected with the power supply and with the brake shoes and acting as a medium through which the pressure exerted by the power is transmitted to the shoes, said lever having three or more arms, one of which is employed only after the lever has been moved, substantially as described.

2. In an air brake mechanism the combination with the air cylinder, its piston and the connection for the brake shoes of a lever connected with the piston and the brake shoes and acting as a medium through which pressure exerted by the piston is transmitted to the shoes, said lever having three or more arms, one of which is employed only after the lever has been moved, substantially as described.

3. In a brake mechanism the combination with the power supply and the connections for transmitting movement to the brake shoes of a lever having three or more arms, the power supply being engaged to the shortest arm of the lever, and the brake shoe connections engaged to the longest arm of the lever, said brake shoe connection engaging the arm of medium length after the lever has been moved, substantially as described.

4. In a brake mechanism the combination with a lever pivoted to a stationary part, and the power supply pivoted to the shortest arm of the lever, of the brake shoe connection pivoted to the longest arm of the lever and extending in such a direction that as the position of the lever is changed by the power the brake shoe connection will engage a shorter arm, substantially as described.

5. In a brake mechanism the combination with a lever pivoted to a stationary part and the power supply pivoted to one arm of the lever, of the brake shoe connection pivoted to another arm of the lever and extending in such a direction that as the position of the lever is changed by the power said brake shoe connection will engage a third arm of the lever, substantially as described.

6. In a brake mechanism the combination with the piston rod and the brake shoe connection of the lever C, said lever being formed with its short arm substantially at right angles to its long arm, the free end of the short arm being pivoted to a stationary part, the piston rod pivoted substantially at the angle of the two arms, the brake shoe connection pivoted to the free end of the long arm and extending substantially parallel with the piston rod, and a point between the free end of the long arm and the pivotal point of the lever which engages the brake shoe connection after the lever has been moved, substantially as described.

7. In a brake mechanism the combination with the piston rod and the brake shoe connection of a lever, said lever being formed with its short arm substantially at right angles to its long arm, the free ends of the two being connected by a brace C′, the free end of the short arm being pivoted to a stationary part, the piston rod pivoted substantially at the angle of the two arms, and the brake shoe connection pivoted to the long arm and extending substantially parallel with the piston rod, whereby as the position of the lever is changed the piston rod and brake shoe connection approach each other and the difference in the proportional leverage length of the two arms is thus altered, substantially as described.

8. In a brake mechanism the combination with the piston rod and brake shoe connection of the lever C pivoted at $c$ to a stationary part, the piston rod being pivoted at $c'$ and the brake shoe connection pivoted at $c^2$, said connection consisting of the links D D′, connecting rod F, and pin E, the latter adapted to rest in the recess $c^3$, substantially as described.

In testimony whereof I sign this specification in the presence of two witnesses.

BENJAMIN WOLHAUPTER.

Witnesses:
W. H. CHAMBERLIN,
M. CHAMBERLIN.